R. WILSON.
WICK RAISING DEVICE FOR TORCHES.
APPLICATION FILED MAY 19, 1919.

1,326,244.

Patented Dec. 30, 1919.

Inventor
Richard Wilson,
By
Attorneys

UNITED STATES PATENT OFFICE.

RICHARD WILSON, OF ECORSE, MICHIGAN.

WICK-RAISING DEVICE FOR TORCHES.

1,326,244.  Specification of Letters Patent.  Patented Dec. 30, 1919.

Application filed May 19, 1919. Serial No. 298,233.

*To all whom it may concern:*

Be it known that I, RICHARD WILSON, a citizen of the United States of America, residing at Ecorse, in the county of Wayne and State of Michigan, have invented certain new and useful Improvements in Wick-Raising Devices for Torches, of which the following is a specification, reference being had therein to the accompanying drawings.

The primary object of my invention is to furnish a torch for miners' lamps, or wick burning devices with simple and effective means for raising or shifting wicks so as to expose an end thereof for proper ignition purposes, the wick adjusting means being embodied within the torch and easily and quickly adjusted at the handle thereof.

A further object of this invention is to provide a strong and durable wick raising device for a torch which will insure better burning of the wick of the torch by maintaining the wick properly adjusted to provide a large flame. The wick raising device also permits of a wick being properly trimmed and maintained in condition to furnish a good light, and by embodying the device within the torch there are no exposed parts that might be broken or otherwise injured during the handling of the torch.

The above and other objects are attained by a mechanical construction that will be hereinafter described and then claimed, and reference will now be had to the drawings, wherein—

Figure 1:
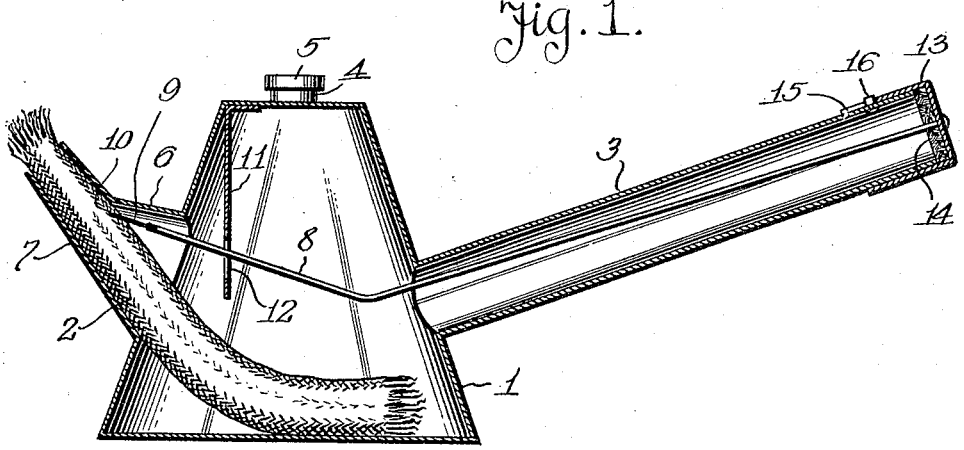
Figure 2:
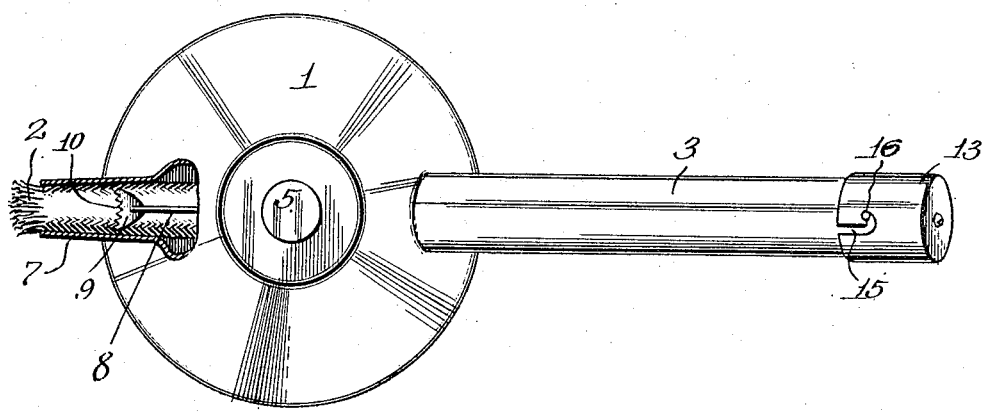

Figure 1 is a vertical longitudinal sectional view of a torch provided with the wick adjusting device and Fig. 2 is a plan of the same showing the spout of the torch partly broken away and partly in section.

In the drawing, the reference numeral 1 denotes a receptacle having a spout 2 and a tubular handle 3. The receptacle 1 is preferably frusto-conical shaped in elevation so as to afford a flat bottom or base of greater area than the top of the receptacle, which has a filling connection 4 normally closed by a cap or closure member 5.

The spout 2 is located at one side of the receptacle 1 and the tubular handle 3 at the opposite side thereof, said tubular handle being of sufficient length to permit of the receptacle 1 being carried by the hand without any danger of the flame from the spout burning the hand. The spout 2 and the handle 3 are disposed at an angle relative to the walls of the receptacle 1 and the inner end of the spout 2 is flared, as at 6, where it communicates with said receptacle, so as to permit of a wick 7 being easily threaded or placed in the spout 2, said wick having its inner end resting on the bottom of the receptacle 1 so as to absorb oil, grease or any illuminating agent placed within said receptacle.

The wick adjusting device is in the form of a rigid rod or wire 8 extending throughout the handle 3 and across the receptacle 1 into the flared end of the spout 2, where said rod is provided with a wick engaging head 9 having teeth, tines or a roughened edge 10 adapted to engage in the wick 7, so that said wick may be advanced in the spout 2. The rod 8 extends through a depending guide 11 carried by the top of the receptacle 1, said guide having a vertical slot 12 providing clearance for the rod 8, also the head 9 of said rod, so that the headed end of the rod may be carried through the tubular handle 3 and through the slot 12 of said guide into the spout 2. The head 9 of the rod 8 assumes a vertical position when passing through the slot 12 of the guide 11 and the rod may be turned a quarter of a revolution to place the head 9 transversely of the wick 7 so that one or more of the teeth of said head may engage said wick and thus permit of the wick being shifted without any danger of the same being torn.

The outer end of the rod 8 is fixed concentrically of a sleeve or cap 13 on the outer end of the tubular handle 3, and within the cap 13 is a gasket or washer 14 that bears against the end of the tubular handle 3 and seals the connection between said handle and the cap, so that should any of the illuminating oil or grease flow into the handle 3 it cannot escape from the outer end of said handle. The cap 13 is provided with a bayonet shaped slot 15 adapted to receive a pin 16 carried by the handle 3 and said pin and slot connection between the cap and handle prevents accidental displacement of the cap 13, but permits of said cap being partially rotated and then reciprocated on the handle 3 so as to shift the rod 8 and cause the head of said rod to advance the wick 7 in the spout 2.

On account of the disposition of the spout 2 in the handle 3 the spout 8 is necessarily bent or somewhat angular so that the greater part of the rod 8 will be centrally of the tubular handle 3 and said rod has sufficient rigidity so that it will not unduly bend when reciprocated to adjust the wick 7 within the spout 2. This wick adjusting device obviates the necessity of sticking nails or other objects into the outer end of the spout 2 to shift the wick therein, and while in the drawing there is illustrated a preferred embodiment of my invention, it is to be understood that the structural elements are susceptible to such variations and modifications as fall within the scope of the appended claims.

What I claim is:—

1. The combination with a torch having a spout and a handle with the spout provided with a wick, of a rod extending through the handle of said torch to the spout thereof and adapted for advancing the wick in the spout of said torch, and means on the handle of said torch to facilitate shifting said rod.

2. The combination set forth in claim 1 and wherein a guide member is located within said torch for guiding said rod.

3. The combination with a torch having a handle, a spout, and a wick in said spout, of a movable sleeve on the outer end of the handle of said torch, and a rod connected to said sleeve and extending through said handle into the spout of said torch and engaging the wick therein for advancing said wick when said sleeve is reciprocated on the handle of said torch.

4. The combination set forth in claim 3, and wherein said rod has a toothed head engaging the wick in the spout of said torch.

5. The combination with a torch having a tubular handle, a spout, and a wick adjustable in the spout of said torch, of a guide member within the torch, a sleeve having a pin and slot connection with the outer end of the handle of the torch, a rod connected to said sleeve and extending through the handle of said torch and the guide member therein, and a toothed head on said rod within the spout of said torch and engaging said wick and adapted to advance said wick in the spout of said torch when the sleeve on the handle of said torch is reciprocated.

In testimony whereof I affix my signature in the presence of two witnesses.

RICHARD WILSON.

Witnesses:
KARL H. BUTLER,
ANNA M. DORR.